(12) United States Patent
Lee

(10) Patent No.: US 12,478,785 B2
(45) Date of Patent: Nov. 25, 2025

(54) CONNECTION DEVICE FOR NEUROSTIMULATOR HAVING MAGNIFIER, KIT FOR NEUROSTIMULATOR, INCLUDING SAME, NEUROSTIMULATOR LEAD USING SAME, AND EXTENSION CABLE CONNECTION METHOD

(71) Applicant: Seoul National University Hospital, Seoul (KR)

(72) Inventor: Pyungbok Lee, Seoul (KR)

(73) Assignee: Seoul National University Hospital, Seoul (KR)

( * ) Notice: Subject to any disclaimer, the term of this patent is extended or adjusted under 35 U.S.C. 154(b) by 386 days.

(21) Appl. No.: 18/018,495

(22) PCT Filed: Jul. 30, 2021

(86) PCT No.: PCT/KR2021/009989
§ 371 (c)(1),
(2) Date: Jan. 27, 2023

(87) PCT Pub. No.: WO2022/025711
PCT Pub. Date: Feb. 3, 2022

(65) Prior Publication Data
US 2023/0372704 A1 Nov. 23, 2023

(30) Foreign Application Priority Data
Jul. 31, 2020 (KR) .................... 10-2020-0096264

(51) Int. Cl.
*A61N 1/36* (2006.01)

(52) U.S. Cl.
CPC ................. *A61N 1/36062* (2017.08)

(58) Field of Classification Search
None
See application file for complete search history.

(56) References Cited

U.S. PATENT DOCUMENTS

| 2011/0264181 | A1 | 10/2011 | Hamilton | |
|---|---|---|---|---|
| 2014/0148885 | A1* | 5/2014 | DeRohan | A61N 1/05 607/116 |
| 2015/0094791 | A1* | 4/2015 | Edgell | G09F 3/10 101/483 |

FOREIGN PATENT DOCUMENTS

| JP | 2013-516224 A | 5/2013 |
|---|---|---|
| JP | 2014-511227 A | 5/2014 |
| JP | 2016-518219 A | 6/2016 |

(Continued)

*Primary Examiner* — Paula J Stice
(74) *Attorney, Agent, or Firm* — Jackson Walker LLP

(57) ABSTRACT

Disclosed are a connection device for a neurostimulator, a kit for a neurostimulator, including same, a neurostimulator lead using same, and an extension cable connection method, the connection device encompassing a connection part for connecting, with an extension cable, the lead of neurostimulator such as a spinal cord stimulator, or an electrode of the lead, wherein the connection device comprises a body and a magnifier, on at least one side of the body, that can magnify the connection part. Therefore, a very complicated process and the time of combining, with a connection cable, the lead of a neurostimulator such as a spinal cord stimulator, or an electrode of the lead can be reduced, and practitioner convenience can be increased.

12 Claims, 5 Drawing Sheets

(56) References Cited

FOREIGN PATENT DOCUMENTS

| JP | 2019-504707 A | 2/2019 |
|---|---|---|
| KR | 10-1033749 B1 | 5/2011 |

* cited by examiner

PRIOR ART

PRIOR ART

CONNECTION DEVICE FOR NEUROSTIMULATOR HAVING MAGNIFIER, KIT FOR NEUROSTIMULATOR, INCLUDING SAME, NEUROSTIMULATOR LEAD USING SAME, AND EXTENSION CABLE CONNECTION METHOD

TECHNICAL FIELD

The present disclosure relates to a connection device having a magnifier for a neurostimulator such as a spinal cord stimulator, a kit including the connection device, and a method of easily performing a process of connecting and fixing a lead of a neurostimulator such as a spinal cord stimulator or an electrode of the lead to a connection cable.

BACKGROUND ART

A neurostimulator is designed to achieve an effect of attenuating or treating pains using neurostimulation, such as a spinal cord stimulator, a deep brain stimulator, a vagus nerve stimulator, and a sacral nerve stimulator. Such a neurostimulator, which is a device supposed to be inserted into a human body, may be considered as a medical instrument that requires a high technique and a large expense.

Representatively, for example, spinal cord stimulator insertion, which is a surgery that inserts a spinal cord stimulator into a spinal extradural space, controls chronic obstinate pains, which are not effected through medicine treatment or injection treatment, by electrically stimulating the spinal cord using a spinal cord stimulator that is an electric stimulator.

To this end, an operator locally anesthetizes the skin of a patient, inserts and positions a needle in a spinal extradural space, and then inserts a spinal cord stimulator electrode into the spinal extradural space while performing fluoroscopy. In this case, the position of the electrode of the spinal stimulator is important and electrical stimulation is continuously applied to check the position.

Meanwhile, since a neurostimulator such as a spinal cord stimulator is inserted into a human body, the length of the electrode of a lead may not be sufficient depending on insertion positions, so the electrode of a lead of a stimulator and an extension cable connecting the electrode are connected in use.

However, an important matter that medical staffs actually feel in the process of inserting a spinal cord stimulator, etc. is that the process of coupling an electrode of a lead to an extension cable is very difficult and time-consuming.

FIGS. 1A to 1E are pictures showing a process of connecting and fixing an extension cable and an electrode of a lead of a spinal cord stimulator of the related art.

Referring to FIGS. 1A to 1E, when an extension cable 20 is coupled to an electrode of a spinal cord stimulator lead 10, a cover 30 for fastening is put on the electrode, a bolt of the extension cable 20 is loosened using a small driver 50, and then the electrode of the lead 10 is inserted into the extension cable 20. Thereafter, procedures are complicated and time-consuming such as a process of checking whether the electrode of the lead 10 and connection electrodes in the extension cable 20 are correctly engaged with each other after locking the extension cable 20 by tightening a bolt, a process of checking whether electricity flows well, and a process of loosening a bolt and then coupling them when a so-called open value is obtained in connection.

Further, there is a need of an additional process of ligating two parts at both sides of the cover 30 with threads 70 for more hermetic fastening, and there is also need of process of finding and removing the threads after 3 to 7 days during removal. For reference, after a tentative implantation period of 3 to 7 days, the electrode of the lead 10 and the extension cable 20 are removed and not used in permanent insertion. Accordingly, it is required to prevent body fluid, etc. from interfering with the flow of electricity or causing side effects such as a vortex or leakage of electricity by permeating into the connection part for the period, so the process of fastening with threads, as described above, is unavoidably performed.

As described above, the process of connecting the extension cable 20 and an electrode of the lead 10 of a spinal cord stimulator, etc. is a difficult, troublesome, and time-consuming with multiple checking, ligating with threads, etc.

BACKGROUND ART LITERATURE

Patent Literature

1. U.S. Patent Application Publication No. 2011-0264181

DISCLOSURE

Technical Problem

The present disclosure has been made in an effort to solve the problems described above, and an objective of the present disclosure, in an aspect, is to provide a fastening device for a neurostimulator having a magnifier, a kit for a neurostimulator, including same, and a method of connecting an electrode of a neurostimulator and an extension cable using same, the fastening device being able to reduce a very complicated process and time for combining an electrode of a lead of a stimulator such as a spinal cord stimulator and a connection cable, to improve convenience for an operator, and to improve hermetic ability even without ligating with threads.

Solution to Problem

Exemplary embodiments of the present disclosure provide a connection device for a neurostimulator, the connection device encompassing a connection part for connecting with an extension cable, an electrode of a neurostimulator lead such as a spinal cord stimulator and including a body and a magnifier, on at least one side of the body, that can magnify the connection part.

Other exemplary embodiments of the present disclosure provide a kit for a neurostimulator, the kit including the connection device for a neurostimulator described above, an electrode of a lead of a neurostimulator, and an extension cable.

Other exemplary embodiments of the present disclosure provide a method of connecting an electrode of a lead of a neurostimulator and an extension cable using the connection device for a neurostimulator described above.

Advantageous Effects of the Invention

According to exemplary embodiments of the present disclosure, it is possible to easily check with naked eye the state in which an electrode of a lead is inserted in an extension cable and the state of whether the electrode has been engaged with connection electrodes in the extension cable in a neurostimulator such as a spinal cord stimulator.

Accordingly, it is possible to minimize the inconvenience for checking whether electrodes are correctly connected every time in the related art.

Further, according to the connection device of exemplary embodiments of the present disclosure, it is possible to easily attach and detach a stimulator to the connection part of an electrode and an extension cable by opening the open gap (opening) on a side, so it is easy to use a stimulator, whereby it is possible to reduce the time for connecting (fastening) an electrode of a lead and the extension cable.

Further, it is possible to very easily connect an electrode of a lead and an extension cable, as described above while easily locking the open gap using a locking device installed at the connection device, for example, a locking device similar to a zipper type or a button type to increase hermetic ability. Accordingly, there is no need for a complicated and difficult process of preventing inflow and absorption of body fluids such as a spinal fluid by covering a stimulator with a cover and then fastening the cover with threads as in the related art, and it is possible to easily mount a stimulator at one time, prevent inflow of body fluids, and achieve high hermetic ability.

Further, according to exemplary embodiments of the present disclosure, ends of the connection device is made of a material having higher hardness than the body or are made relatively thick, whereby it is possible to prevent twisting or bending of the portion that is connected to an electrode. Accordingly, it is possible to prevent a short circuit or interference with a current in a wire even if an unexpected force such as tension or an external force is generated at the connection part of an electrode and an extension cable in a body.

DESCRIPTION OF REFERENCE NUMBERS

Figure 1A:
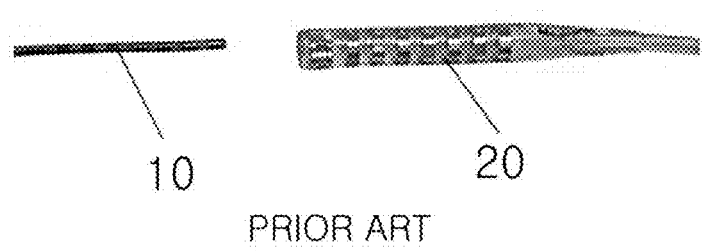
FIGS. 1A to 1E are pictures showing a process of connecting and fixing an extension cable and an electrode of a lead of a spinal cord stimulator of the related art.
Figure 1B:
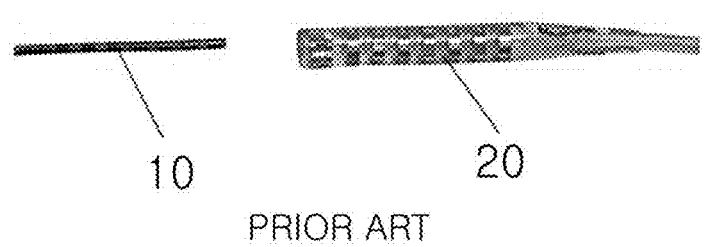
Figure 1C:
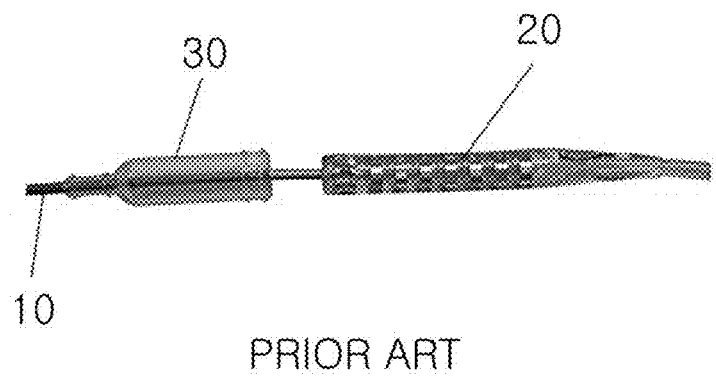
Figure 1D:
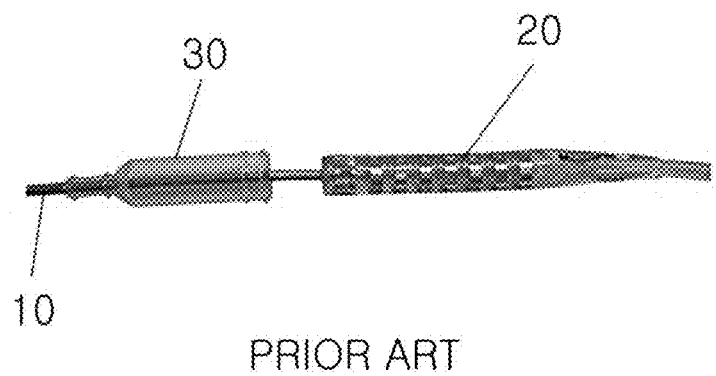
Figure 1E:
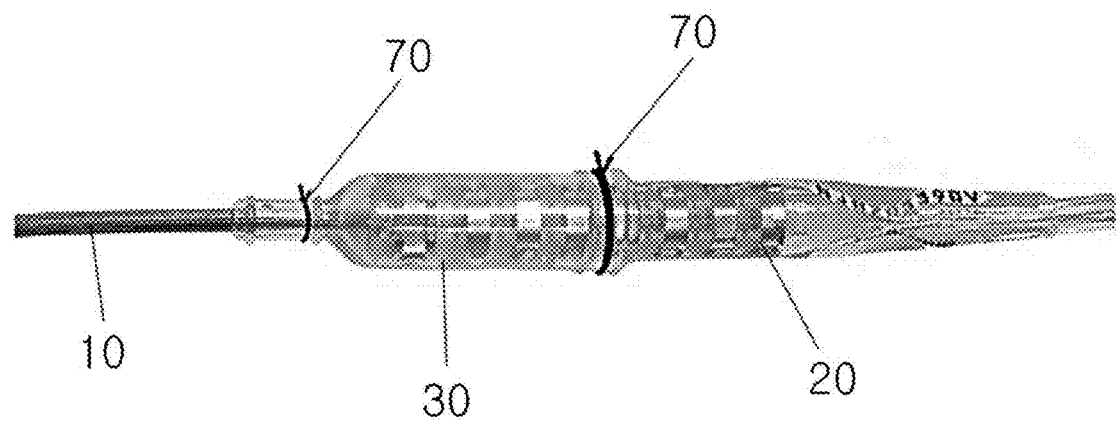

10: Lead
11: Lead electrode
20: Extension cable
25: Connection electrode in extension cable
30: Cover
50: Driver
70: Thread
100: Connection device for spinal cord stimulator
110: Magnifier
130: Body
131: First end
133: Second end
150: Opening
170: First locking device
171: Protrusion
173: Recess
180: Second locking device
181: Hinge blade
183: Protrusion
L1: Length of first end
L2: Length of second end

MODE FOR INVENTION

The terms "upper portion" and "lower portion" or "over" and "under" should be understood as relative position concepts in the specification. For example, when a device having parts indicated as an upper portion and a lower portion is turned over, it will be understood that they can be referred to as an upper portion and a lower portion with reference to the turned-over direction.

In the specification, a connection device for a neurostimulator means a device encompassing a connection part of a lead of a neurostimulator or an electrode of the lead and an extension cable.

In the specification, a connection part of a lead or an electrode of the lead and an extension cable means a part in which the lead or the electrode of the lead is inserted and connected in the extension cable.

In the specification, a neurostimulator is representatively a spinal cord stimulator, but may include other neurostimulators having a lead or an electrode of a lead and an extension cable.

Hereafter, exemplary embodiments of the present disclosure are described through preferred embodiments of the present disclosure with reference to the accompanying drawings. In various embodiments, components having the same configuration are given the same reference numerals and representatively described in an embodiment, and only other components are described in other embodiments. Hereafter, the present disclosure are described with reference to the embodiments shown in the figures, but these are merely exemplary embodiments, and the spirit, the main configuration, and application of the present disclosure are not limited by the embodiments.

Figure 2:
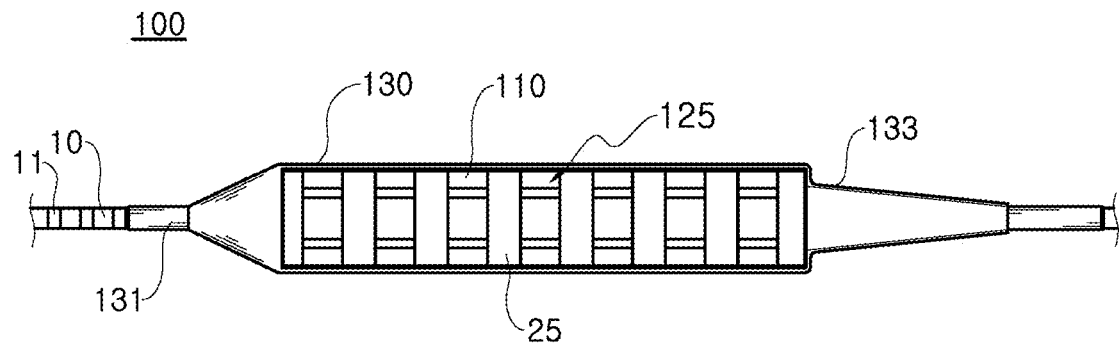
FIG. 2 is a schematic view showing a connection device for a spinal cord stimulator having a magnifier according to an embodiment of the present disclosure.

FIG. 2 is a schematic view showing a connection device for a spinal cord stimulator having a magnifier according to an embodiment of the present disclosure.

As shown in FIG. 2, a connection device 100 for a spinal cord stimulator having a magnifier 110 according to an embodiment of the present disclosure has a body 130 for example having a cylindrical shape and fixing an electrode 11 of a lead 10 and an extension cable 20 while encompassing a connection part (125) at which the electrode 11 and the extension cable 20 are connected, and a magnifier 110 disposed at a side of the body 130.

It is possible to magnify the connection part (125), at which the electrode 11 of the lead 10 and the extension cable 20 are connected, through the magnifier 110. FIG. 2 shows connection between circular connection electrodes 25 in the extension cable 20 and the electrode 11 of the inserted lead 10 magnified by the magnifier 110. When the magnifier 110 is used, as described above, it is possible to easily check whether the electrode 11 of the lead 10 and the connection electrodes 25 in the extension cable have been connected well, whereby connecting the electrode 11 of the lead 10 and the extension cable 20 are made convenient and less time-consuming.

In an embodiment, the magnifier 110 may be a magnifying lens made of transparent glass or transparent plastic and being able to magnify objects such as a convex lens. Since the magnifier is used for living bodies such as a human body, a plastic material that is transparent more than glass and is suitable for living bodies is preferable.

An electric display may be used as the magnifier 110, but it may increase the manufacturing cost and may influence a stimulator cable, so it is preferable to use the magnifier described above in order to exclude electric devices.

In an embodiment, the body 130 includes a first end 131 at the lead 10 side and a second end 133 at the extension cable 20 side. The first end 131 has an inner diameter corresponding to the outer diameter of the lead 10 such that the lead 10 is fitted thereto, and the second end has an inner diameter corresponding to the outer diameter of the extension cable 20 because the extension cable 20 is fitted therein. The connection device has a shape of which the diameter increases from the first end 131 to the body 130 and then decreases toward the second end 133, whereby it is possible to sufficiently magnify the connection part (125) and increase hermetic ability at the ends.

In an embodiment, the length of the magnifier 110 is set such that all of the electrodes (e.g., eight electrodes) of the extension cable can be seen.

In an embodiment, the first end 131 may have a length L1, for example, of about 4 to 6 mm or 5 mm.

In an embodiment, the length L2 of the second end 133 is larger than the length of the first end 131, and for example, may be about 10 to 15 mm or 11 to 14 mm, or 12 to 13 mm. Further, the length of the entire body 130 including the first end 131 and the second end 133 may be, for example, about 58 to 62 mm or about 60 mm.

In an embodiment, the material of the body 130 may be a biocompatible material such as silicone rubber. For example, since a spinal cord stimulator is inserted into a human body and maintained between a skin and a fascia, a spinal cord stimulator may be made of medical materials having a grade for such application. Further, the body is configured to be hard and to have suitable resilience to be hermetically mounted and easily attached/detached, as described below.

Further, hermetic ability should be secured at the ends 131 and 133, particularly, the end 131 at the lead 10 side to prevent external substances such as the spinal fluid or other body fluids from permeating into them. Accordingly, to this end, it is preferable that the materials of the ends 131 and 133 are of a material having higher hardness than the material of the body 130, or have a thickness larger than those of other portions of the body, or are harder and thicker than other portions of the body.

Figure 3A:
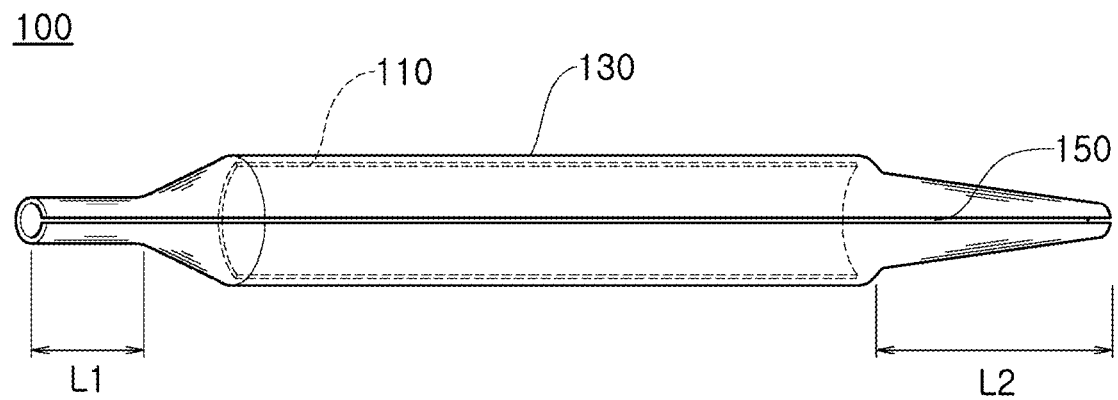
FIG. 3 is a schematic view showing a connection device for a spinal cord stimulator having a magnifier according to another embodiment of the present disclosure (FIG. 3A), and a shape when an electrode of a lead and an extension cable are connected using the connection device (FIG. 3B).
Figure 3B:
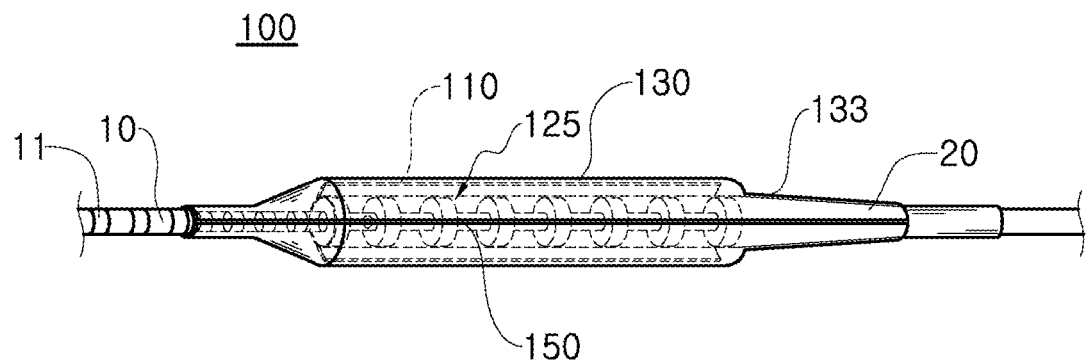

FIG. 3 is a schematic view showing a connection device for a spinal cord stimulator having a magnifier according to another embodiment of the present disclosure (FIG. 3A), and a shape when an electrode of a lead and an extension cable are connected using the connection device (FIG. 3B).

As shown in FIG. 3, the connection device 10 for a spinal cord stimulator has an opening (i.e., an open gap) 150 on a side of the body 130, for example, on the opposite side to the side at which the magnifier is disposed. By forming the opening 150, it is possible to easily attach/detach the connection device 100 to/from the connection part (125) of the electrode 11 of the lead 10 and the extension cable 20. That is, when detaching the connection device after opening the opening and mounting the connection device to encompass the connection part (125), it is possible to detach the connection device by opening the open gap, for example, with a medical forceps. The body 130 may be configured to have appropriate hardness and resilience so that attaching and detaching are not excessively difficult in this case.

Meanwhile, when the opening 150 is formed as described above, the spinal fluid or other body fluids may interfere with flow of a current by flowing inside and coming into contact with electrodes, so a specific locking device or locker may be further provided to prevent such problem and increase hermetic ability (sealing characteristic).

Figure 4:
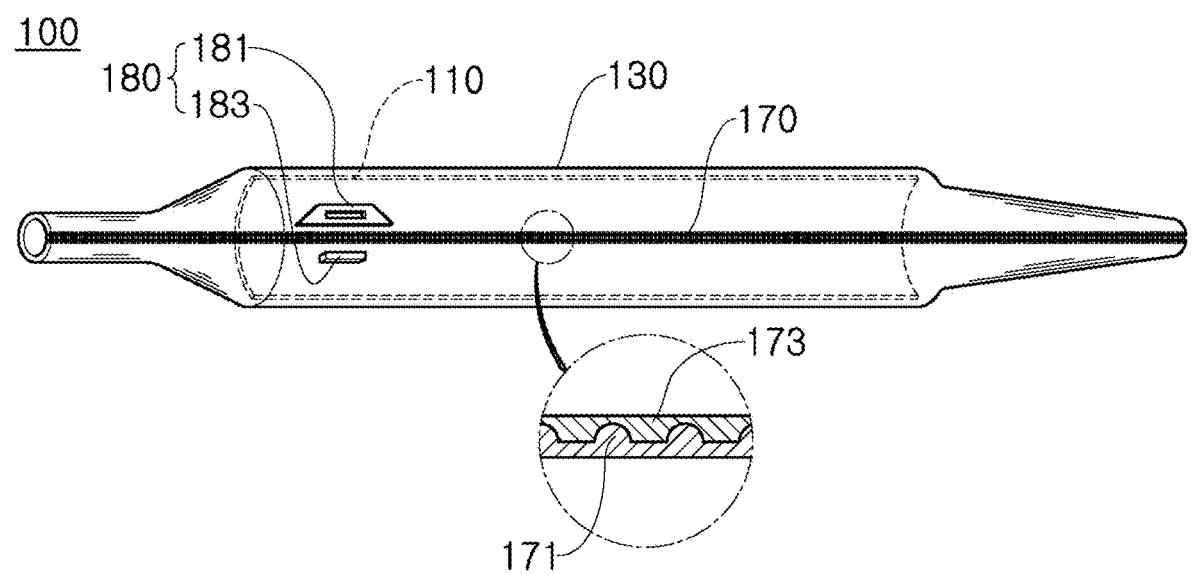
FIG. 4 is a schematic view showing a case in which the connection device for a spinal cord stimulator having a magnifier of FIG. 3A further includes a locking device.

FIG. 4 is a schematic view showing a case in which the connection device for a spinal cord stimulator having a magnifier of FIG. 3A further includes a locking device.

As shown in FIG. 4, a first locking device (locker) 170 is formed at the opening (150 in FIG. 3A), that is, the open gap on the opposite side to the side at which the magnifier is disposed in the body 130 of the connection device 100 for a spinal cord stimulator.

The first locking device 170 fastens the upper side and the lower side of the open gap of the opening such that the upper and lower sides are engaged with each other.

To this end, the first locking device 170 may be, for example, a zipper type, that is, may be closed by engaging teeth. Alternatively, the first locking device 170 may have protrusions 171 formed with regular intervals at the lower side (or upper side) of the opening and recesses 173 formed at the upper side (or lower side) of the opening and corresponding to the protrusions 171, whereby first locking device 170 may be fastened by engaging the protrusions and the recesses.

The first locking device 170 may be made of a material having hardness lower than that of the material of the other portions of the body. As such material, biocompatible materials such as silicone-based rubber or carbon organic materials may be used.

Further, in addition to or instead of the first locking device 170 described above, a second locking device 180 may be provided to further secure hermetic ability. The second locking device 180, for example, may be a hinge locker composed of a hinge blade 181 and a protrusion 183 that is fitted in a through-hole of the hinge blade 181. The protrusion 183 is fitted like a button into the through-hole of the hinge blade 181, whereby both ends of the opening can be tightly fastened. One second locking device 180 is shown in FIG. 4, but a plurality of second locking devices 180 may be provided along the opening, and it is preferable to form the second locking device 180 close to the ends 131 and 133 to increase hermetic ability at the ends 131 and 133, particularly, the end 131 at the electrode side.

Those skilled in the art may understand, with reference to be above description, that the present disclosure can be achieved in other detailed ways without changing the spirit or the necessary features of the present disclosure.

Therefore, it should be understood that the embodiment described above is not limitative, but exemplary in all respects, the scope of the present disclosure is expressed by claims described below, not the detailed description, and it should be construed that all changes and modifications achieved from the meanings and scope of claims and equivalent concept are included in the scope of the present disclosure.

INDUSTRIAL APPLICABILITY

The present disclosure, in an aspect, relates to a connection device for a neurostimulator such as a spinal cord stimulator having a magnifier, a kit including the connection device, and a method of easily performing a process of connecting and fixing an extension cable and a lead or an electrode of a lead of a neurostimulator such as a spinal cord stimulator using the connection device, the connection device being able to reduce a very complicated process and time for coupling an electrode of a lead of a stimulator such as a spinal cord stimulator and an extension cable, to improve convenience for an operator, and to improve hermetic ability even without ligating with threads.

The invention claimed is:

1. A connection device encompassing a connection part connecting a lead or an electrode of a lead of a neurostimulator and an extension cable, the connection device comprising:
   a body; and a magnifier disposed on at least one side of the body that can magnify the connection part, and
   wherein the body includes an end at the electrode side and an end at the extension cable side,
   the end at the electrode side and the end at the extension cable side are of a material having higher hardness than other portions of the body, or have a thickness larger than those of other portions of the body, or are harder and thicker than other portions of the body,
   an inner diameter of the end at the electrode side corresponds to an outer diameter of the electrode to give hermetic ability, and
   an inner diameter of the end at the extension cable side corresponds to an outer diameter of the extension cable to give hermetic ability.

2. The connection device of claim 1, wherein an opening is formed on a side of the body so that the connection device can be easily attached/detached to/from the connection part.

3. The connection device of claim 2, wherein the opening is an open gap extending from an end of the body at the electrode side to an end at the extension cable side.

4. The connection device of claim 3, wherein the opening further includes one or more locking devices for fastening the open gap.

5. The connection device of claim 4, wherein the locking device is a zipper formed along the open gap and is locked by engaging.

6. The connection device of claim 4, wherein the locking device includes protrusions formed on a side of the open gap and recesses formed on another side and is locked by engaging the protrusions and the recesses.

7. The connection device of claim 4, wherein the locking device is composed of a hinge blade and a protrusion that is fitted into a through-hole of the hinge blade and is locked by fitting the protrusion into the through-hole of the hinge blade.

8. The connection device of claim 2, wherein the magnifier is a magnifying lens made of transparent glass or transparent plastic.

9. The connection device of claim 8, wherein the magnifying lens is positioned in a longitudinal direction of the body on a side of the body except for the end at the electrode side and the end at the extension cable side,
   the opening is an open gap positioned at an opposite side to a position at which the magnifying lens is positioned, and extending from the end at the electrode side and the end at the extension cable side of the body, and
   one or more locking devices for fastening the open gap are provided.

10. The connection device of claim 1 wherein the connection device for a neurostimulator is a connection device for a spinal cord stimulator.

11. A kit for a neurostimulator, the kit comprising:
    the connection device for a neurostimulator of claim 1;
    a neurostimulator lead; and
    an extension cable.

12. A method of connecting a neurostimulator lead and an extension cable using the connection device for a neurostimulator of claim 1.

* * * * *